(12) United States Patent
Tobin et al.

(10) Patent No.: US 7,965,068 B2
(45) Date of Patent: Jun. 21, 2011

(54) SWITCHING POWER SUPPLY CONTROLLER WITH HIGH FREQUENCY CURRENT BALANCE

(75) Inventors: David A. Tobin, Austin, TX (US); Xiaogang Feng, Santa Clara, CA (US); Tod F. Schiff, Portland, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/950,621

(22) Filed: Nov. 19, 2010

(65) Prior Publication Data

US 2011/0062928 A1 Mar. 17, 2011

Related U.S. Application Data

(62) Division of application No. 11/685,091, filed on Mar. 12, 2007, now Pat. No. 7,888,921.

(51) Int. Cl.
*G05F 1/00* (2006.01)

(52) U.S. Cl. ........................................ 323/282; 323/283

(58) Field of Classification Search .................. 323/282, 323/283, 212, 220, 222, 237, 241, 242, 267, 323/271, 275, 285
See application file for complete search history.

(56) References Cited

U.S. PATENT DOCUMENTS

| 5,822,200 | A | 10/1998 | Stasz | 363/21.18 |
| 6,204,649 | B1 | 3/2001 | Roman | 323/282 |
| 6,731,524 | B2 * | 5/2004 | Elek et al. | 363/70 |
| 7,019,507 | B1 | 3/2006 | Dittmer et al. | 323/284 |
| 7,504,810 | B1 | 3/2009 | Tagare | 323/282 |
| 2005/0184717 | A1 | 8/2005 | Walters | 323/284 |
| 2006/0006816 | A1 * | 1/2006 | Alexandrov | 315/291 |
| 2007/0290664 | A1 | 12/2007 | Moyer et al. | 323/272 |
| 2008/0224678 | A1 * | 9/2008 | Tobin et al. | 323/283 |

* cited by examiner

*Primary Examiner* — Adolf Berhane
*Assistant Examiner* — Nguyen Tran
(74) *Attorney, Agent, or Firm* — Robert F. Hightower

(57) ABSTRACT

A controller for a multi-phase switching power supply shuffles the sequence of the phases in response to a load transient to prevent synchronization of one or more phases with high-frequency load transients. The sequence may be shuffled by varying the frequency and/or sequence of the switching control signals to introduce a random variation in the phases.

5 Claims, 5 Drawing Sheets

SWITCHING POWER SUPPLY CONTROLLER WITH HIGH FREQUENCY CURRENT BALANCE

The present application is a divisional application of prior U.S. application Ser. No. 11/685,091, filed on Mar. 12, 2007, now U.S. Pat. No. 7,888,921 which is hereby incorporated by reference, and priority thereto for common subject matter is hereby claimed.

BACKGROUND

FIG. 1 illustrates a prior art switching power supply. The system of FIG. 1 includes a modulator 10 that generates switching control signals SC1 and SC2 to drive switch circuits 12 and 14, thereby controlling the amount of power delivered to the load 16 through inductors 18 and 20. An output capacitor 22, which includes an equivalent series resistance (ESR), filters the output from the inductors. A voltage mode error amplifier circuit 24 generates an error signal $V_{ERR}$ in response to the output voltage $V_{OUT}$ so the modulator can modulate the switch signals to maintain a constant output voltage regardless of the amount of current consumed by the load. The sensed output voltage is combined with an input signal $V_{REF}$ to generate the error signal that is applied to the modulator for closed-loop control of the output. The modulator 10 shown in FIG. 1 is assumed to provide pulse-width modulation (PWM), but other modulation schemes such as pulse frequency modulation (PFM), hysteretic control (ripple regulation), etc., may be used.

The system of FIG. 1 also includes a current sensing circuit 26 to generate a signal $V_{CS}$ that provides a measure of the total combined output current delivered to the load. The current sense signal may be used in numerous ways. For example, it may be used to provide over-current shutdown, it may be used to implement current-mode regulation, or it may be combined with voltage feedback to establish a droop impedance for adaptive voltage positioning (AVP) control schemes.

The system of FIG. 1 is known as a multi-phase switching power supply because the power components including the switches and inductors are repeated to produce multiple output currents that are summed together to provide the total output current. This increases the amount of current available from the power supply. The system of FIG. 1 has two phases, but any suitable number of phases may be used. Multi-phase switching power supplies are commonly used to provide power for microprocessors which require very large currents at voltages that must be regulated to within tight limits to prevent damage to the CPU.

To generate the multiple switching control signals SC1 and SC2 needed for multi-phase switching, the modulation circuit 10 includes multiple comparators 28,30 and driver logic 32. Each comparator receives a ramp signal at one input and the error signal $V_{ERR}$ at the other input. The comparator outputs are gated by driver logic 32 so the switching control signals SC1 and SC2 are pulsed in sequence to drive the switches properly, and to provide various features such as current limiting, over/under voltage shutdown, etc. The ramp signals are generated by oscillator 34 at a frequency that is determined by the value of a resistor $R_T$.

A current balance circuit 36 adjusts the individual ramp signals for each phase to prevent thermal or electrical overstress that can occur when one phase delivers more current than the other phases. A typical current balance circuit may operate by comparing the current delivered by each individual phase to a common reference point. In the system of FIG. 1, the individual phase currents may be monitored through sense resistors $R_S$. The modulation of each switching control signal can then be adjusted so that all phases deliver the same amount of current.

DETAILED DESCRIPTION

Conventional current balance circuits/algorithms operate on the assumption that load transients are relatively low frequency events, i.e., the load current varies at frequencies that are substantially lower than the switching frequency of the switching power supply. This assumption becomes invalid when the switching power supply is used with an advanced microprocessor. Newer microprocessors may toggle their current consumption at frequencies upwards of 1~2 MHz, while many multi-phase DC/DC converters still operate at switching frequencies of around 300 KHz.

Conventional current balance techniques are insufficient to prevent severe current imbalance when used with CPUs that toggle their load current at certain frequencies above 50 KHz. This imbalance may be caused by the coincidental alignment of switching pulses with load transients. For example, certain phases may always happen to be on during a high-current or attack portion of a high frequency load transient, while other phases may always be on during the low-current or release portion of the load current. The phases that are always on during the high current portion are subjected to more thermal and electrical stress.

Figure 1:
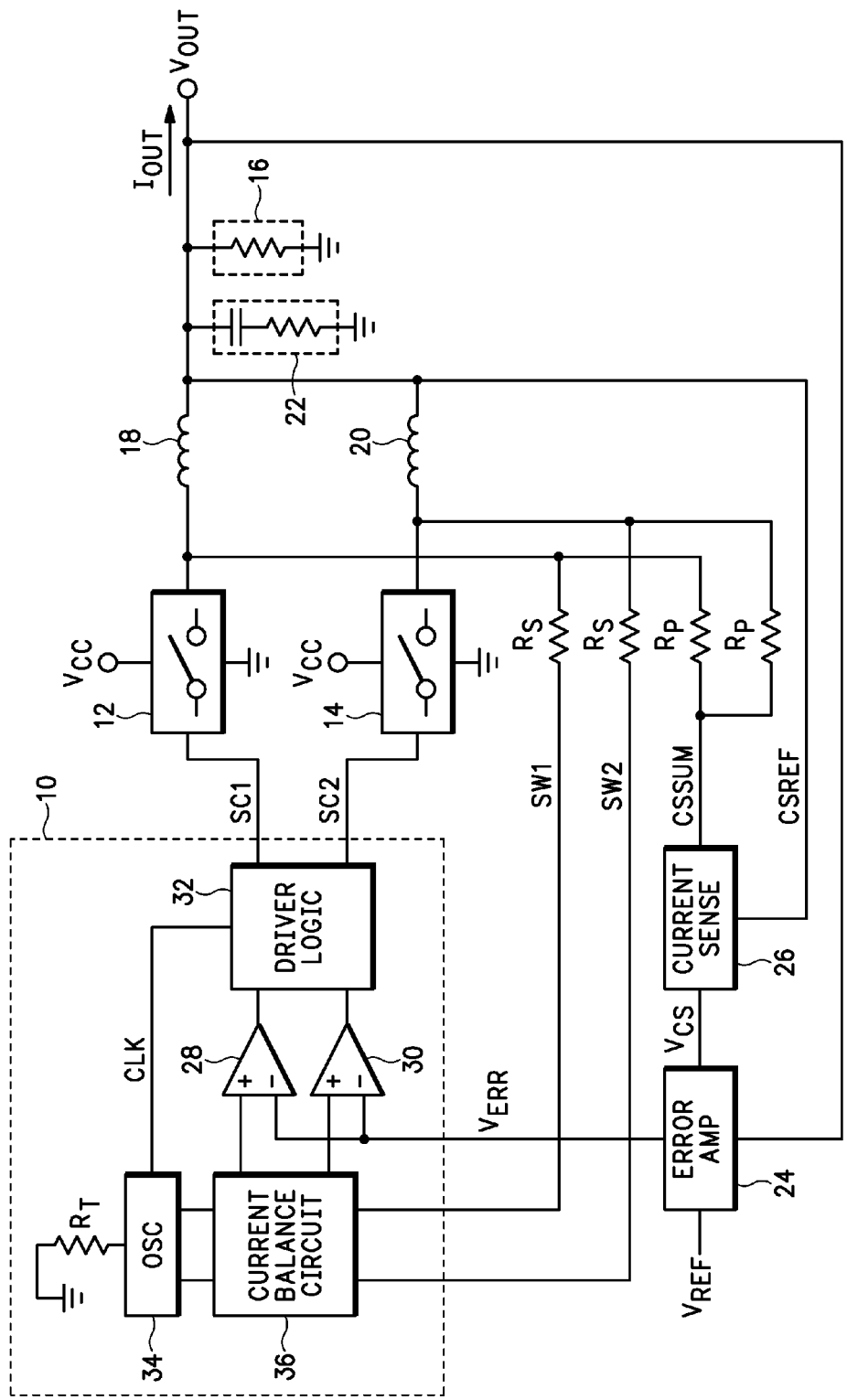
FIG. 1 illustrates a prior art switching power supply and controller.
Figure 2:
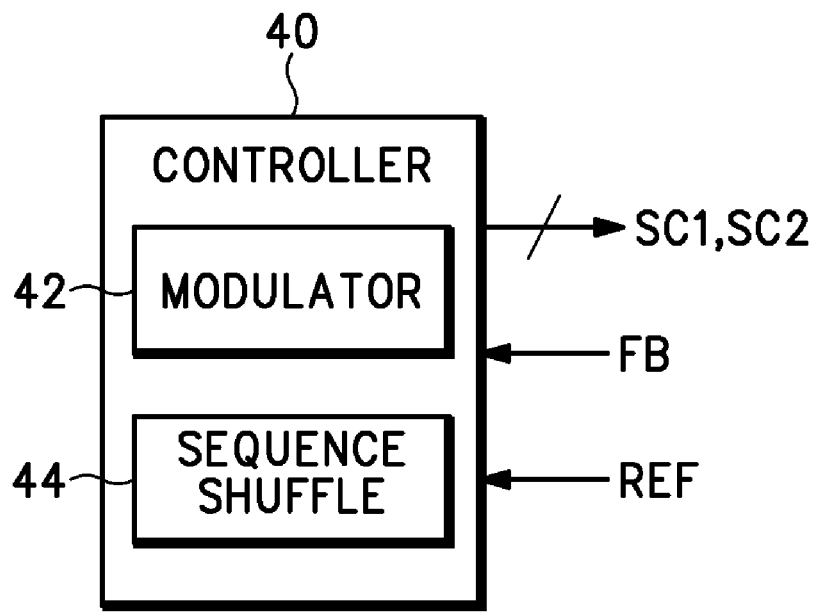
FIG. 2 illustrates an embodiment of a switching power supply controller according to some of the inventive principles of this patent disclosure.

FIG. 2 illustrates an embodiment of a switching power supply controller 40 according to some of the inventive principles of this patent disclosure. The embodiment of FIG. 2 includes a modulation circuit 42 to generate switching control signals SC1,SC2 for a multi-phase switching power supply. The modulator may implement any suitable switching control scheme such as PWM, PFM, etc. The embodiment of FIG. 2 also includes circuitry 44 to shuffle the sequence of the switching control signals in response to a load transient. The circuitry 44 may shuffle the sequence by varying the frequency of the switching control signals, by varying the sequence of the switching control signals, and/or by introducing a random variation to the switching control signals. These variations may be implemented in response to a load transient event such as a load release or other event high-frequency transient that might otherwise cause a load imbalance.

Figure 3:
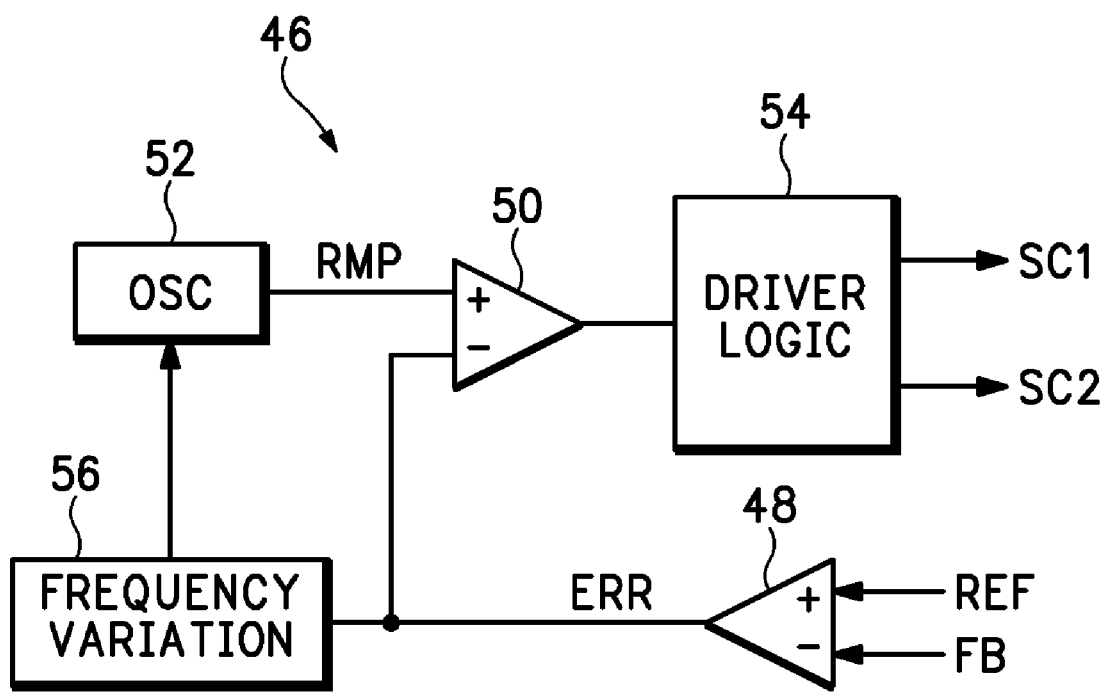
FIG. 3 illustrates an embodiment of a switching power supply controller that introduces a frequency variation according to some of the inventive principles of this patent disclosure.

FIG. 3 illustrates another embodiment of a switching power supply controller 46 according to some of the inventive principles of this patent disclosure. In this example, the controller implements a two-phase PWM control scheme, but the inventive principles are not limited to these specific details. The embodiment of FIG. 3 includes an error amplifier 48 that generates an error signal ERR in response to a set point reference REF and a feedback signal FB that provides information on the load. A comparator 50 compares the error signal ERR to a ramp signal RMP generated by an oscillator 52. Driver logic 54 generates the final switching control signals SC1,SC2 in response to the output from the comparator.

Circuity 56 is arranged to vary the oscillator frequency, and therefore the frequency of the switching control signals, in response to load transients that are detected at the output of the error amplifier. For example, in a voltage mode regulation scheme, a sudden increase or reduction in load current may show up as an abrupt change in the output of the error amp. Circuity 56 senses this change and increases or decreases the oscillator frequency to introduce a random change in the switching control signals SC1,SC2. If the load change is part of a periodic high-frequency load transient, the random variations in the switching control signals may disrupt any undesirable alignment between a specific phase and the load transient, thereby spreading peak transient loads more evenly between all phases. Circuity 56 may also be arranged to perform a similar function in a current mode regulation scheme or in a hybrid strategy where voltage mode regulation is provided with current feedback, e.g., droop regulation.

Figure 4:
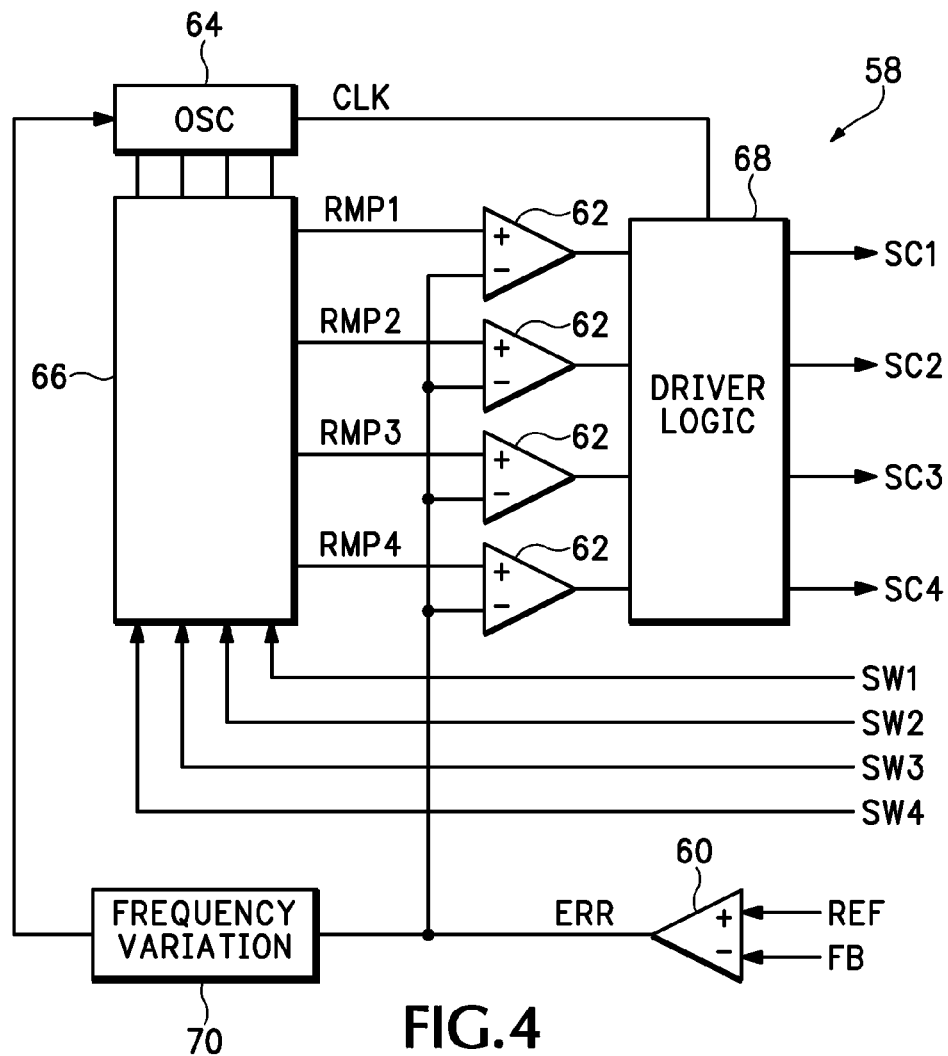
FIG. 4 illustrates another embodiment of a switching power supply controller that introduces a frequency variation according to some of the inventive principles of this patent disclosure.

FIG. 4 illustrates another embodiment of a switching power supply controller 58 according to some of the inventive principles of this patent disclosure. In this example, the controller implements a four-phase PWM control scheme similar to that shown in FIG. 3, but this embodiment also integrates a conventional low-frequency current balance arrangement into the controller. The system of FIG. 4 includes an error amplifier 60 that generates an error signal ERR in response to a set point reference REF and a feedback signal FB. A series of comparators 62 compares the error signal ERR to a series of ramp signals RMP1,RMP2 that are generated by an oscillator 64 and adjusted by current balancing circuit 66. In one embodiment, current balancing circuit 66 compares the current of individual phases with an average current of all phases. Driver logic 68 generates the final switching control signals SC1,SC2 in response to the outputs from the comparators. Circuitry 70 is arranged to vary the oscillator frequency in response to load transients that are detected at the output of the error amplifier. By integrating the frequency varying circuitry 70 and the current balancing circuit 66 into the same controller, the embodiment of FIG. 4 may provide a flexible and robust solution in which load current is balanced between phases during both high and low frequency load transients, as well as steady state (constant load) operation.

Figure 5:
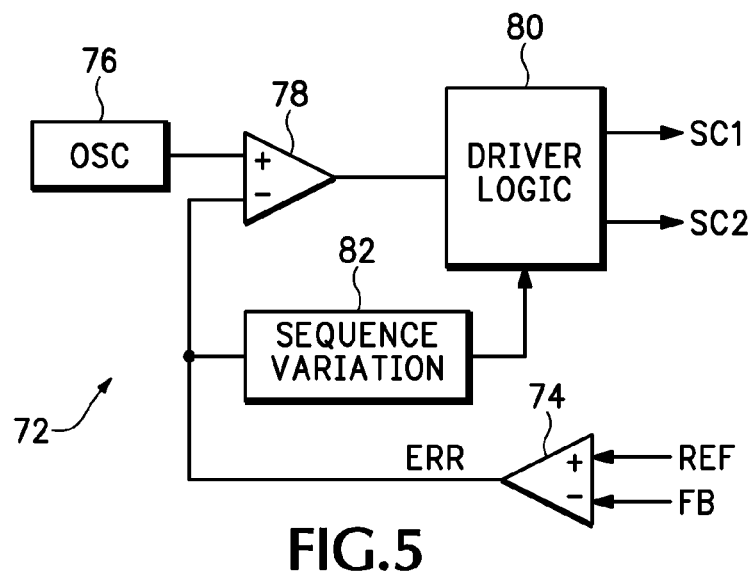
FIG. 5 illustrates an embodiment of a switching power supply controller that introduces a phase sequence variation according to some of the inventive principles of this patent disclosure.

FIG. 5 illustrates another embodiment of a switching power supply controller 72 according to some of the inventive principles of this patent disclosure. In this example, the controller implements a two-phase PWM control scheme, but rather than varying the frequency of the oscillator, the embodiment of FIG. 5 varies the alignment of the switching control signals by varying the sequence of the signals in response to a load transient. The embodiment of FIG. 5 includes an error amplifier 74, oscillator 76, comparator 78 and driver logic 80 arranged in a manner similar to that shown in FIG. 3. However, circuitry 82 is arranged to vary the sequence of the switching control signals in response to load transients detected at the output of the error amplifier. The sequence varying circuitry 82 may be separate from, or integrated into the driver logic 80. A low-frequency current balancing circuit may also be integrated into this embodiment.

Figure 6:
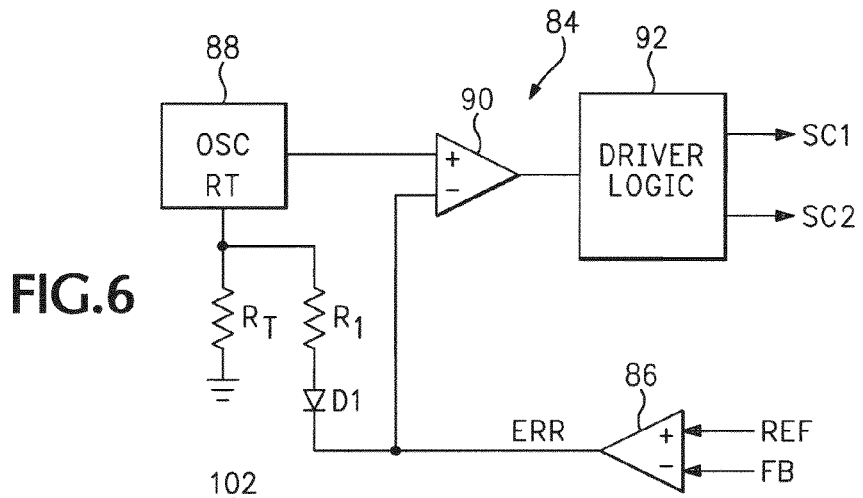
FIG. 6 illustrates an embodiment of a switching power supply controller having a transient detector according to some of the inventive principles of this patent disclosure.

FIG. 6 illustrates another embodiment of a switching power supply controller 84 according to some of the inventive principles of this patent disclosure. In this example, an error amplifier 86, oscillator 88, comparator 90 and driver logic 92 are arranged in a PWM configuration as described above. The oscillator includes an input RT that allows the switching frequency to be set by the value of a timing resistor $R_T$. In this embodiment, the switching frequency increases as the total resistance connected to the frequency setting input of the oscillator decreases. A diode D1 and Resistor R1 are connected in series between the oscillator input and the output of the error amplifier 86. In this configuration, when the error amp output signal is pulled low during a load release, the diode/resistor combination D1/R1 pulls current out of the oscillator input, thereby increasing the switching frequency. This pulls in the next PWM pulse in the switching control signals and reshuffles the phases. Thus, any alignment between the phases and peaks in the load current may be broken up to more evenly distribute the peak load current among the phases.

Figure 7:
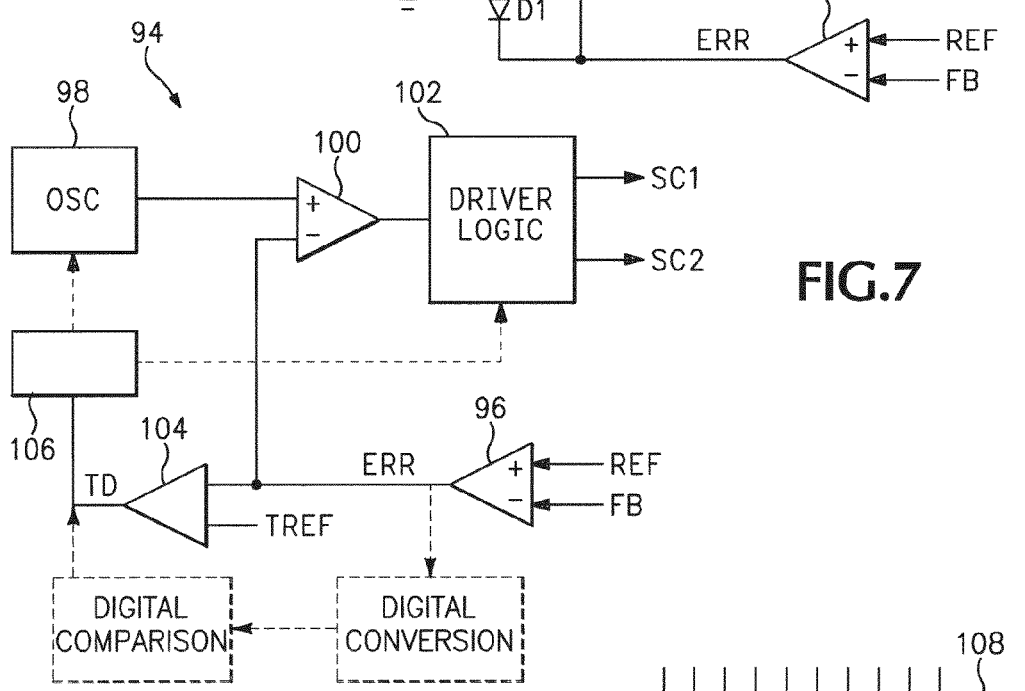
FIG. 7 illustrates another embodiment of a switching power supply controller having a transient detector according to some of the inventive principles of this patent disclosure.

FIG. 7 illustrates another embodiment of a switching power supply controller 94 according to some of the inventive principles of this patent disclosure. In this example, an error amplifier 96, oscillator 98, comparator 100 and driver logic 102 are arranged in a PWM configuration as described above. The embodiment of FIG. 7 includes a comparator 104 that compares the error signal to a reference signal TREF to determine when a load transient occurs. Upon detecting a transient, the comparator activates circuitry 106 that may change the oscillator frequency, reorder the phase sequence, or otherwise introduce a random change to the PWM sequence/timing to disrupt any coincidental synchronization of phases with load peaks.

Figure 8:
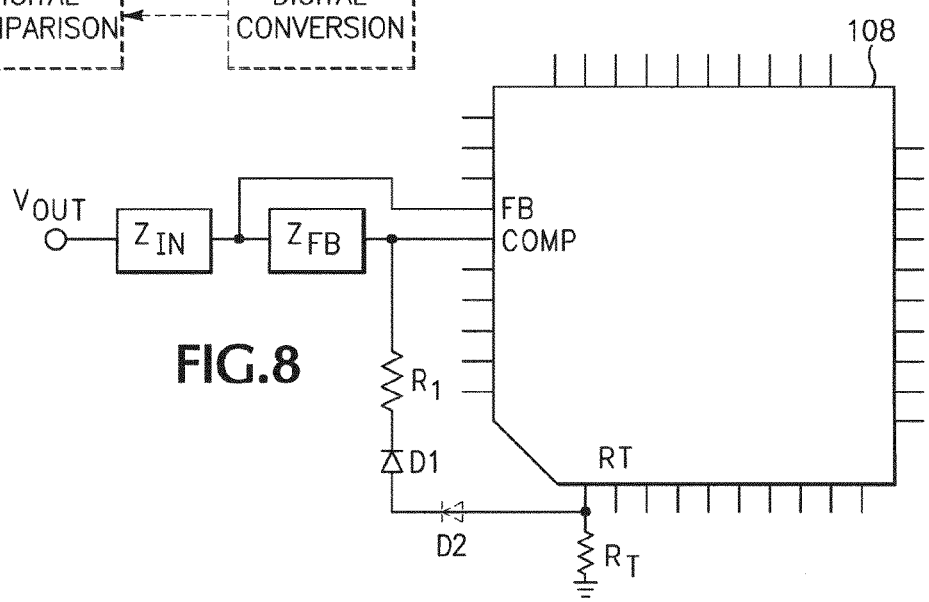
FIG. 8 illustrates another embodiment of a switching power supply controller according to some of the inventive principles of this patent disclosure.

FIG. 8 illustrates another embodiment of a switching power supply control system according to some of the inventive principles of this patent disclosure. This embodiment includes a commercially available switching power supply control IC (integrated circuit) 108, for example, an ADP3192, ADP3194, etc. The IC has a first terminal RT to control an oscillator on the integrated circuit, and a second terminal COMP to provide a measure of the output controlled by the integrated circuit. The signal at the COMP terminal is provided by an internal error amplifier in response to a feedback signal received at a terminal FB and a reference signal that sets the output level of the power supply and which may also provide current feedback. The IC may be configured for voltage mode control, in which case input and feedback networks $Z_{IN}$ and $Z_{FB}$ are arranged to sense the output voltage $V_{OUT}$ and set the gain of the error amplifier. The functions of the remaining IC terminals are set forth in product data sheets and application notes and will not be repeated here so as not to obscure the inventive principles.

In the embodiment of FIG. 8, a diode D1 and resistor R1 are connected in series between the COMP and RT terminals to provide a transient-responsive frequency change. The value of R1 may be set to any suitable value that provides enough frequency shift to reshuffle the phases. At light loads, the output of the error amp may be low enough to cause D1 to turn on and conduct current through R1, thereby changing the oscillator frequency. Thus, it may be beneficial to insert an additional diode, as illustrated by dashed line diode D2, in series with the D1/R1 combination to increase the combined threshold of the frequency varying circuit.

The embodiment of FIG. 8 may provide a simple and flexible, but very effective upgrade to systems that utilize existing switching power supply controller ICs. The diode/resistor combination may be implemented as a patch that can be applied to existing designs. It may even be piggybacked onto a circuit board that has been designed and built already. Alternatively, it may be used in new circuit board designs that utilize commercial controller ICs. As yet another alternative, it may be designed directly into an integrated circuit.

Figure 9:
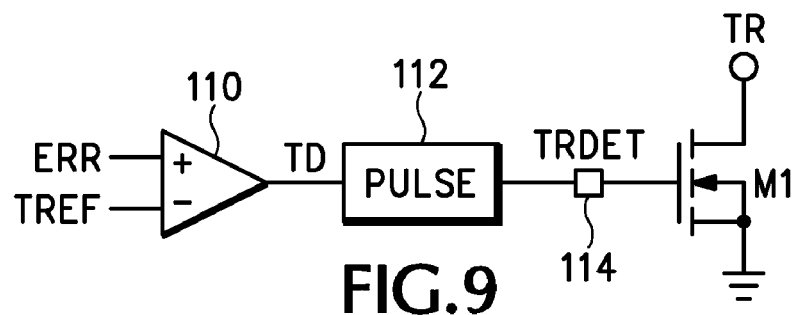
FIG. 9 illustrates an embodiment of a transient detector according to some of the inventive principles of this patent disclosure.

FIG. 9 illustrates an embodiment of a transient detector according to some of the inventive principles of this patent disclosure. A comparator 110 generates a transient detect signal TD by comparing an error signal ERR to a reference signal TREF. A pulse generator 112 generates a second transient detect signal TRDET having a short pulse in response to an edge in the TD signal. If the circuit of FIG. 9 is integrated on a switching power supply controller IC, the TRDET signal may be brought out to a pin 114 to enable the user to implement a transient-responsive frequency change as in FIG. 8, but without the need for a diode. That is, the resistor R1 may be connected directly between the TRDET and RT pins of the controller IC 108. However, if other transient-triggered features are included, it may be necessary to include the diode to prevent interference with the other features. A transistor M1 may be connected to the output of the pulse generator 112 to provide a more flexible interface. The TRDET pin 114 may alternatively be connected to the output of the comparator 110 or the collector/drain of transistor M1.

Figure 10:
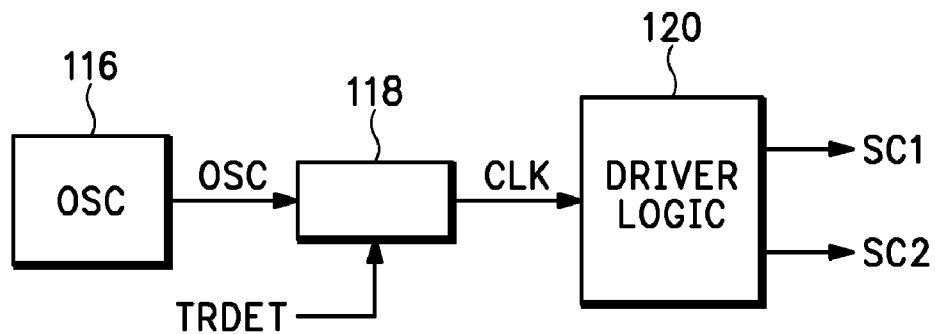
FIG. 10 illustrates an embodiment of a phase shuffling arrangement according to some of the inventive principles of this patent disclosure.

FIG. 10 illustrates an embodiment of a phase shuffling arrangement according to some of the inventive principles of this patent disclosure. An oscillator 116 and driver logic 120 are arranged to generate multiphase switching control signals SC1 and SC2 in a manner similar to the embodiments of FIG. 5 or 7. A shuffling circuit 118 is arranged to vary the sequence of the switching control signals SC1 and SC2 in response to a transient detect signal TRDET by changing the manner in which the oscillator signal OSC from oscillator 116 is applied to the driver logic 120 as a clock signal CLK.

Figure 11:
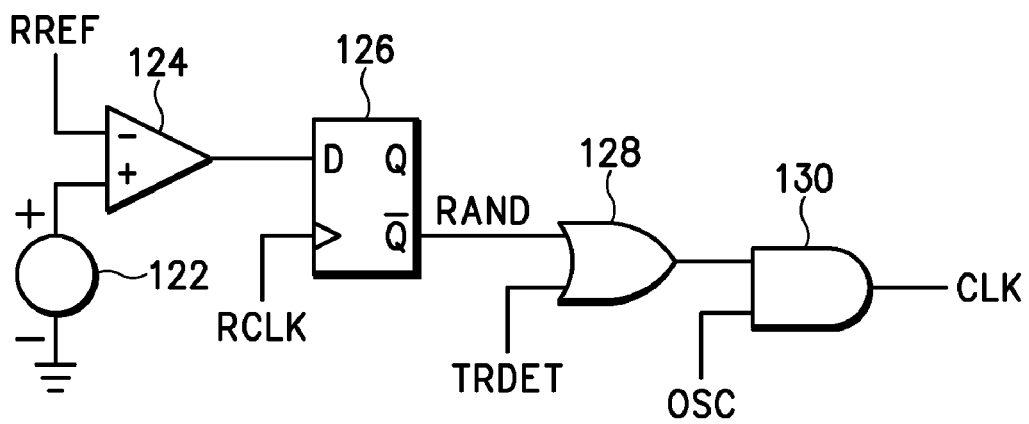
FIG. 11 illustrates an example embodiment of a randomizer according to some of the inventive principles of this patent disclosure.

FIG. 11 illustrates an example embodiment of a randomizer suitable for use as the shuffling circuit shown in FIG. 10. The embodiment of FIG. 11 includes a white noise signal source 122, a comparator 124 and a D flip-flop 126 arranged to generate a random pulse signal RAND. The white noise source is compared to a reference voltage RREF and applied to the D input of the flip flop. The flip-flop is clocked by a clock signal RCLK which may operate at some frequency that is on the same order of magnitude of as the switching frequency. The random pulse signal RAND is combined with the transient detect signal TRDET by a first logic gate 128. The output of gate 128 is then used to gate the oscillator signal OSC through a second logic gate 130 which provides the clock output CLK to the driver logic.

During a transient event, for example a load release, the clock signal CLK may be blanked randomly to reshuffle any pattern relationship that may develop between the load frequency and the frequency of the switching control signals. Although the inventive principles are not limited to a specific type of transient event, shuffling the phases during a load release may be a particularly beneficial technique for balancing high frequency load currents. Since randomization occurs during load release, there may be no significant jitter or dithering. Moreover, it may maintain a controlled peak of circulating current per phase.

The benefits of shuffling phases during a blanking period for the switching control signals are not limited to the embodiment of FIG. 11. For example, as discussed above with respect to FIG. 6, the oscillator frequency may be temporarily increased during a load release so that the phases are reshuffled during the time that the switching control signals are blanked due to an overshoot in the output voltage. Likewise, in the embodiment of FIG. 8, the timing parameters and component values may be implemented so that the RT terminal is only pulled down by the diode circuit or by a TRDET signal when there is a load change that causes the power supply output to exceed a nominal regulation range. When the output comes back into the regulation range, the RT terminal is released, and the oscillator returns to its normal operating frequency. In this example, since the oscillator frequency may only be changed during a blanking period, the increase in the frequency of the switching control signals only happens internally to the controller, and there may be no perceptible change in the actual frequency of the switching control signals as seen from outside the controller.

The embodiments described above may be implemented in various forms in accordance with the inventive principles. Some of the embodiments are described above in the context of analog circuitry where signals are realized as voltage or current mode signals, but digital implementations are also possible according to the inventive principles of this patent disclosure. In a digital implementation, a signal (e.g., an error signal) may take the form of a digital value, and the circuitry, amplifier, etc. that manipulates this value may be embodied as logic, i.e., hardware, software, firmware, etc. or a combination thereof.

For example, the controller of FIG. 7 may be implemented with analog circuitry, in which case the comparator 104 may monitor the ERR signal as an analog value. In a digital implementation, load transients may be detected by monitoring an EPWM signal as a digital value. The inventive concepts are not limited to any particular number of phases. Although some embodiments are described in the context of a PWM control scheme, the inventive principles may be applied to other switching power supply control schemes such PFM, hysteretic, etc.

Since the embodiments described above can be modified in arrangement and detail without departing from the inventive concepts, such changes and modifications are considered to fall within the scope of the following claims.

The invention claimed is:

1. A switching power supply controller comprising:
   a modulation circuit to generate switching control signals to control the output of a multi-phase switching power supply in response to an error signal, the modulation circuit including an oscillator to control the frequency of the switching control signals, the oscillator having an input to set the switching frequency;
   an error amplifier arranged to generate the error signal in response to the output of the switching power supply and a reference signal; and
   a diode and a resistor arranged in series between an output of the error amplifier and the input of the oscillator to shuffle the sequence of the switching control signals by increasing the frequency to an increased frequency in response to a load transient and maintaining the increased frequency during the load transient.

2. The controller of claim 1 where the modulator includes a current balance circuit to provide low-frequency current balance by comparing the current of individual phases with an average current of all phases.

3. A switching power supply control system comprising:

an integrated circuit including a multi-phase PWM switching power supply controller configured to generate switching control signals to control an output of the multi-phase switching power supply system, the multi-phase PWM switching power supply controller having a first terminal to control an oscillator on the integrated circuit, and a second terminal to provide a measure of the output controlled by the integrated circuit; and a diode and a resistor coupled between the first and second terminals to shuffle a sequence of the switching control signals by increasing a frequency of the oscillator to an increased frequency in response to a load transient and maintaining the increased. frequency during the load transient.

4. The system of claim 3 further comprising a second diode connected in series with the diode and the resistor.

5. The system of claim 3 where the diode and the resistor are external to the integrated circuit.

* * * * *